United States Patent [19]

Bolte et al.

[11] Patent Number: 4,990,364
[45] Date of Patent: Feb. 5, 1991

[54] SOLVENT-FREE, LOW-MONOMER OR MONOMER-FREE POLYMERIZABLE HOT MELT COATING PROCESS

[75] Inventors: Georg Bolte, Vechelde; Rudolf Hinterwaldner, Moosach-Altenburg, both of Fed. Rep. of Germany

[73] Assignee: 501 Schmalbach Lubeca AG, Fed. Rep. of Germany

[21] Appl. No.: 129,110

[22] Filed: Dec. 4, 1987

[30] Foreign Application Priority Data

Dec. 4, 1986 [DE] Fed. Rep. of Germany ....... 3641436

[51] Int. Cl.$^5$ ............................................. B05D 3/06
[52] U.S. Cl. .................................. 427/44; 427/54.1; 427/385.5; 427/386; 427/388.2; 427/389.9; 427/393.5; 427/394
[58] Field of Search ............. 427/44, 54.1, 386, 385.5, 427/388.2, 389.9, 393.5, 394

[56] References Cited

U.S. PATENT DOCUMENTS 3,928,265 12/1975 Dhein et al. .......................... 260/21
4,175,977 11/1979 Heaton et al. ....................... 106/272

FOREIGN PATENT DOCUMENTS 154924 3/1985 European Pat. Off. .
184349 6/1986 European Pat. Off. .
1917788 10/1970 Fed. Rep. of Germany .
2436186 3/1974 Fed. Rep. of Germany .
2914982 10/1980 Fed. Rep. of Germany .

Primary Examiner—Bernard Pianalto

[57] ABSTRACT

There are described solvent-free, low monomer or monomer-free polymerizable melt compositions suitable for the corrosion and abrasion resistant coatings of substrates and formed bodies of metal, plastic, cellulose materials and/or inorganic materials and/or the creation of a protective film with barrier properties and methods of making them. The melt compositions are particularly useful especially for use in packaging, and comprise: (a) at least one polymerizable, hydroxyl-containing polymer having an average molecular weight ($\overline{M}w$) of between 1,000 and 500,000 and a glass transition temperature (Tg) of $\geq +20°$ C., and/or (b) at least one polymerizable, linear unbranched and/or branched polyester and/or its copolymer having an average molecular weight ($\overline{M}w$) of between 800 and 50,000 and a glass transition temperature (Tg) of $\geq -50°$ C., and/or (c) a polymerizable oligomer carrying an ethylenically unsaturated group, of the following group consisting of acrylic, methacrylic, ether, ester, urethane, amide, imide, epoxide, siloxane, phenol, novolak and/or mercapto compounds having an average molecular weight ($\overline{M}w$) of between 400 and 10,000, and (d) if required, conventional additives. Further described are processes for preparing these melt compositions and methods of further processing these melt compositions and finishing planar substrates and/or shaped bodies with these melt compositions. Moreover, the present invention relates to a process for polymerization or curing of the melt composition.

19 Claims, 2 Drawing Sheets

FIG. I

SOLVENT-FREE, LOW-MONOMER OR MONOMER-FREE POLYMERIZABLE HOT MELT COATING PROCESS

BACKGROUND OF THE INVENTION

1. Field of Invention

This invention relates to a solvent-free, low monomer or monomer-free, polymerisable and radiation-hardenable melt composition for coating members of the group consisting of planar substrates, formed bodies of metal, plastic, cellulose material, inorganic material and a method for its production. The melt composition according to the invention is particularly suited to the corrosion-and-abrasion resistant finishing of planar packaging material substrates, preferably those used in the foodstuffs and pharmaceutical industries. Substrates finished with the melt composition according to the invention can be utilized in other areas, e.g. in the manufacture of automobile bodies, construction and in similar industrial applications.

2. Description of the Related Art

Corrosion-and-abrasion resistant finishing or treatment of planar substrates of metal, plastic and cellulose materials is a technical requirement that is defined by the materials to be treated. The purpose of the treatment is to protect objects against environmental damage and thus extend their lifetime. Protection against corrosion now plays an important role in the economy. In packaging materials, particularly those used in the foodstuff and pharmaceutical industries, additional high requirements are demanded of the anti-corrosion composition. The latter must be physically and chemically inert in the presence of a packaged product and must not release any toxic substance(s), or any substance(s) capable of altering taste or odour characteristic, into the surrounding area. In order to meet these requirements, state-of-the-art finishing systems must incorporate solvent-containing coating materials and lacquers. In this product group, the solvents serve as important auxiliary substances in that they enable the anti-corrosion substances consisting of polymers and resins to be utilized since the raw or starting materials for the latter are available primarily only as solids. The fluid state of the coating substance is further useful in that it "wets" the surface to be protected which is an important precondition for adhesion.

The solvents required for the above process may be aliphatic or aromatic solvents, such as e.g. esters, ketones, toluols, xylols, and the like substances. After the coating is applied and allowed to set, the solvents must be removed from or driven out of the protective coating material. Years ago, these solvents were simply driven off and permitted to escape into the atmosphere. However, legislation in the past few years has restricted such emissions. As a consequence, recycling processes have been proposed to attempt to recover the solvents. Despite the relatively high yield afforded by such recovery plants and the impressive practical rate of recovery (up to 95%), such processes are highly capital intensive in terms of investment and operation. Additionally, they also entail the disadvantage that the solvent-containing emissions, in order to conform to statutory air purity requirements, must be treated by after-burning. A further problem related to solvent recycling is that many of these solvents consist of mixtures of two or more solvents and therefore cannot be readily used with other coating materials or lacquers. Also, the recovered solvents and their mixtures are not capable of unlimited application, which is to say that after some recycling processes, such solvents must be eliminated, e.g. burnt off. In summary, these treatment processes are technically and economically quite burdensome and practically in no case are they 100% effective.

A partial improvement in the coating or treatment process has been achieved by using anti-corrosion agents having an aqueous dispersion base with a high solids content. With regard to the aqueous anti-corrosion agents, however, it has been demonstrated in many industrial sectors that the use of organic solvents cannot be completely dispensed with. Thus, the problem of solvent recovery originated. This affects primarily electrical coating by dipping where dispersion lacquers with solvent contents of up to 20% relative to the finished product are employed.

Recently, however, solvent-free coating materials and lacquers have also become known These substances employ the so-called "one-pot" and "multi-pot" systems. In the one-pot system, ready for application, the material becomes re-activated and cross-linked in the presence of air moisture, while in the case of a two or more pot system, the product can be used only after homogeneous mixing. Due to the fact that these anti-corrosion materials ready for application possess a so-called "pot-time" in which they can be applied, such materials have, for industrial application purposes, a series of disadvantages which cannot always be compensated for by the use of mixing and dispensing apparatus. Since they must furthermore be present as solvent-free, anti-corrosion materials in a fluid aggregate state, their individual reactive components consist of relatively low molecular compounds. These low molecular weight compounds, known also as reactive diluents, are in many ways not only physiologically harmful but possess distinct and characteristic negative taste and smell characteristics. The degree of cross-linking achievable, being only in the vicinity of $\leq 90\%$ ensures amongst other matters that these products cannot be used to finish packaging materials for foodstuffs or pharmaceuticals. Technically speaking, however, too low a degree of cross-linking may hamper resistance against environmental influences. In general, the reactive diluents have the disadvantage that, when residues, even in parts per million amounts, are not cross-linked, they negatively influence adhesion to the boundary surface, since they are able to disperse much like solvents.

In order to accelerate the curing or the cross-linking process, polymerisable coating materials and lacquers have become known, which can be hardened by ionising radiation, notably electron and UV radiation.

In order for coating materials and lacquers to harden in the presence of UV-radiation, so-called photoinitiators and even synergists must be added. These photosensitive additives, however, after curing remain in the anti-corrosion layer and, during stacking operations or if in contact with packed product, contaminate the latter and as they are considered to be harmful to health, cannot be used for food or pharmaceutical packaging. The curing procedure involving ionizing radiation, however, does not require the addition of photosensitive substances or synergists. The state-of-the-art radiation-hardenable coating materials and lacquers present another considerable disadvantage in that they must, for processing purposes, have a relatively high acrylic group monomer content, the latter serving as application-facilitating reactive diluents. While some acrylic monomers are potentially harmful, others are known to be toxic. The existence of taste-and-smell-influencing substances that either escape into the atmosphere or come into contact with the packaged product, particularly foodstuffs and pharmaceuticals, remains one of the greatest disadvantages; it can be caused by the presence of very small amounts of monomer residue, even in the very low parts-per-million range.

Such anti-corrosion materials provide no certainty to technologists seeking in the future to finish objects under environmentally compatible and hygienic conditions, since the present state of the art provides no solutions that can meet these requirements. High standards have already been set regarding food and pharmaceuticals packaging, examples of which can be found in directives issued by the Federal Health Department (Germany) in its publication "Kunststoffe im Lebensmittelverkehr" ("Plastics in the Food Handling Industry"), and in directives published by the Food and Drug Administration and in various other national environmental codes. A further problem is caused by the additives required to produce conventional anti-corrosion materials. This has been described in Gächter/Müller "Kunststoff-Additive" 2. Ausgabe, Hanser-Verlag, München, 1983, im Kapitel 18 "Gewerbe-und lebensmittel-hygienische Aspekte von Kunstoff-Additiven" ("Plastic Additives" 2nd Edition, Hanser-Verlag, München, 1983, volume 18 of "Hygienic Aspects of Plastic Additives in Industrial and Foodstuffs Sectors"). This subject has been more fully explored in the paper by Piringer et al. on "Der Einfluss von Restlösehmitteln und monomeren Acrylaten aus Verpackungen auf die sensorischen Eigenschaften von Lebensmitteln" ("The Effect of Residual Solvents and Monomer Acrylates in Packaging Materials on the Sensory Properties of Foodstuffs"), in Verpackungsrundschau, Issue 8/1986, pp 53–58, since the premise had already been established that the residual solvents and the acrylic monomers have a particular sensory influence on the packaged food products. This paper demonstrates that, when inert solvents, acrylates or methacrylates are employed, the indicated relative threshold values of the latter for smell and taste remain problematic when such low-molecular compounds are used. Thus, the relative threshold value, for example in the case of n-butylacrylate is 0.002 and in the case of 2-ethyl-hexylmethacrylate is 0.02 mg/kg.

It can furthermore be said that, aside from differences in approach, the evaluation of the statutory measures and regulations concerning the environment, and industrial and personal hygiene, are substantially identical in the European Common Market, the American Market and in Japan. Comprehensive and comparative explorations of this area have been published by Keener, R. L., Plamondon, J. E. and West, A. S. in "Recent Developments in the Regulation of Industrial Chemicals in the United States and Europe", presentation by RADCURE EUROPE '85, Basel/Switzerland, Sponsor: AFP/SME, Dearborn, Mich. 48121, U.S.A. and in the book by Ronald Brickman et al. "Controlling Chemicals: The Politics of Regulation in Europe and the United States" Cornell University Press, Ithaca, N.Y., 1985.

Conventional lacquers and varnishes with different polymer bases which are dissolved in solvents have been amply described in the literature, as, for example in H. Kittel "Lehrbuch der Lacke und Beschichtungen" Bd. 4, 5 und 7, (Introduction to Lacquers and Coatings Vols. 4, 5 and 7 ) Verlag W.A. Colomb Verlagsgesellschaft mbH, Berlin und Oberschwandorf. Reference may be made to this publication for that purpose, and accordingly, it will not be necessary to consider this prior art in particular.

Similarly, corrosion-and-abrasion-resistant finishing of planar substrates and/or formed bodies (especially those containing metal and cellulose materials) which comprise coating agents without inert solvents, is well known and understood in industrial practice. In this connection, coating substances were employed, whereby either the backbone polymers were dissolved in reactive diluents or the base products were sufficiently fluid to be applied. Although these reactive diluents and/or other fluid co-reactants are integrated in the polymer matrix either by hardening or by cross-linking, residues remain, the amount of which depends upon the degree of cross-linking attained These non-integrated residues can neither be removed by additional costly cleansing processes, nor can they be reduced to amounts permissible under existing regulations. Because such compositions are also potentially harmful to the human body, such anti-corrosion materials have only a limited applicability, the implication of which being that such materials must be entirely excluded from use in the pharmaceutical and foodstuffs industries.

This is due solely to the fact that the sensory qualities (taste and smell) of such packaged products are easily affected. Although qualitative improvements may be made to non-thermosensitive substrates by baking and/or subsequent curing, such measures are seldom capable of ensuring compliance with required minimum standards. To this must be added the cost of such after-treatment, which is in turn reflected in the cost of the final product. Efforts have been made, therefore, to discover improved and economically sounder alternatives to radiation hardening, which would at the same time improve the product marketability. Due to the costs of attempts to meet minimum cross-linking levels—as has already been discussed, the radiation-hardenable coatings compositions have not produced the desired breakthroughs. Thus, in European patent application 0 157 396 thus are described radiation-hardenable compositions for sheet steels, which remain moldable after curing. Due to the fact, however, that these materials are processed at room temperature, they possess a relatively high proportion of reactive diluents, i.e. low-molecular acrylic monomers. Apart from featuring a relatively high residual monomer content, these radiation-hardened coating materials have only a limited workability or moldability. Experts are aware that, as the proportion of short-chain, low-molecular monomers in a coating matrix increases, so does toughness and brittleness. During processing, a great number of hairline cracks can appear in the anti-corrosion film, which significantly reduces product effectiveness.

In European Patent Application 0 184 349, radiation-hardenable, thermoplastic coating materials for wood and other substrates are described, which consist of copolymerisable ethylenically unsaturated polyesters and thermoplastic polymers. In order to be able to process these as coating materials, monomers, i.e. reactive diluents and/or inert organic solvents, are required. In this regard, coating materials have been proposed which, while offering good end product qualities, do not overcome the problems of inert solvent evaporation nor solvent and monomer residues.

For the purpose of anti-corrosion finishing, so-called "hot melt" compositions are known, whose structure is based upon inert resins, waxes, thermoplastics and/or elastomers. Use of the term "hot" is considered inappropriate (see Römpp's Chemie-Lexikon, 8. Aufl., Bd. 3/1983, s. 1763 (Römpp's Chemical Dictionary, 8th Edition., Volume 3/1983, page 1763), and accordingly, reference only to melt compositions will be used herein.

Melt adhesives, which are related to melt compositions, have achieved prominence in many sectors, but melt compositions have remained relatively unknown apart from their application in some areas such as anti-corrosion films. The latter are produced by using a dip of the melt composition, which may include cellulose esters, plasticizing mixtures and mineral oil additives, so that e.g. equipment or machine parts, are dipped in the hot composition and then left to cool. The film or coating thus developed may then be removed without leaving any residue.

Whether the melt compositions are employed for coating or for adhesive purposes, the thermoplastic raw materials, which include resins and plasticizers, are thermosensitive and hence subject to thermal oxidation, particularly in the presence of atmospheric oxygen. In this case, not only are the properties of the product altered, but physiologically harmful crack-products are also produced. The thermal problems connected herewith are described by the internationally used term "Heat History". Whereas with melt adhesives stabilizers and antioxidants can be used, the latter can be used with melt compositions only after they have been accepted for use in the technical sense. Such thermo-oxidative decomposition can be minimized by masking with inert gases such as nitrogen (N$_2$). A further disadvantage of using thermoplastic melt coating materials is that of their relatively low plasticization points, which should lie below +150° C., particularly below +120° C. A further disadvantage in this regard is that the backbone polymers in their end state are already macromolecules and therefore require very high process temperatures, from 180° C. to +270° C., in order to achieve sufficient wetting and thus adhesion to the various substrate surfaces. While materials exist that remain molten at lower temperatures, such materials possess no thermal stability and little chemical resistance. Such melt coating materials, which are for example described in DE-OS 24 25 395, have a formula based on ethylene-vinylacetate copolymers. Other melt compositions are described in the monograph by R. Jordan "Schmelzklebstoffe", Bd. 4a/1985 und Bd. 4b/1986, ("Melt adhesives"), Vol. 4a/1985 and Vol. 4b/1986, HINTERWALDNER VERLAG, München". Included in the discussion are polyester melt compositions whose structures, based on linear copolyesters of terephthalic and/or isophthalic acid, can range from amorphous to crystalline. (DE-OS 24 14 287).

In order to better control the critical parameters which influence the "Heat History" and at the same time to improve the end properties such as thermal stability, reactive melt compositions have been proposed. Such melt compositions were mainly adhesive and sealing materials, which although processed analogously to melt coating material from a molten mass at temperatures below ≦150° C., especially ≦100° C. and therefore workable at an early stage, underwent cross-linking only in the presence of atmospheric humidity. Such materials are ideally moisture-hardened polyurethane systems. Depending on the layer thickness and the surrounding humidity, the curing process requires from 1 to 96 hours for completion. Such a curing process is, from the industrial standpoint, an immutable necessity even though un-integrated curing components are able to migrate To date, other reactive melt compositions have neither been treated in the literature nor known in industry, wherefore the reasons cannot be solely those related to the so-called "Heat History", but are to be found in the unavailability suitable raw materials. Additional preventive measures alone are not sufficient to ensure compliance with increasingly demanding standards for environmental protection, food processing hygiene, workplace hygiene and sensory effects on packaging materials, since such measures entail both higher investments in plant, measuring equipment, etc. as well as expensive control systems.

For improved environmental protection and better workplace and food handling hygiene, it would be advantageous to address existing and potential product deficiencies by eliminating as far as possible their causes and thus decrease costs. Despite the numerous attempts already made, it has not been possible to manufacture melt compositions that possess even a fraction of the properties attributed to materials containing organic solutions. Since, however, corrosion-resistant finishes have, for economic reasons, already become a matter of public concern and necessity, the present invention is aimed at identifying innovative processes for the future which will eliminate and/or reduce the above-discussed and other deficiencies, while rectifying and/or reducing sensory problems and those related to food packaging and workplace hygiene.

SUMMARY OF THE INVENTION

One aspect of the invention relates to a solvent-free, low-monomer or monomer-free polymerisable hot melt suitable as a corrosion-and-abrasion-resistant coating or finish on planar substrates and/or shaped bodies of metal, plastic, cellulose materials and/or inorganic materials, preferably for use in producing formed bodies employed in packaging materials, consisting of
(a) at least one polymerisable hydroxyl-containing polymer with an average molecular weight ($\overline{M}_w$) of between about 1,000 and about 500,000 and a glass transition temperature of ($T_g$)≧+20° C.; and/or
(b) at least one polymerisable linear straight chain and/or branched polyester and/or their copolymers with an average molecular weight ($\overline{M}_w$) of between about 800 and about 50,000 and a glass transition temperature ($T_g$)≧−50° C.; and/or
(c) a polymerisable, ethylenically unsaturated oligomer carrying a group chosen from those including acrylic, methacrylic, ether, ester, urethane, amide, imide, epoxide, siloxane, phenol, novolak, and/or mercapto compounds with an average molecular weight ($\overline{M}_w$) of between about 400 and about 10,000; and
(d) other conventional additives, if desired or required The polymerisable polymers of a) above containing hydroxl-groups according to one aspect of the invention are ethylenically unsaturated, thermoplastic polymers with an average molecular weight ($\overline{M}_w$) of between about 1,000 and about 500,000, preferably between about 10,000 and about 300,000, more preferably between about 20,000 and about 200,000. The glass transition temperatures ($T_g$) of these backbone polymers is about $\geq +20°$, preferably $\geq +60°$ C., more preferably $\geq +90°$ C. The plasticization and melting points lie in the vicinity of $\geq +70°$ C., preferably $\geq +100°$ C. The polymerisable, ethylenically, unsaturated groups are present in a proportion of about $\geq 0.1$ weight percent, preferably $\geq 0.5$ weight percent. The ethylenically unsaturated group is an organic residue of the general formula 1:

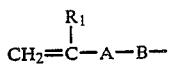

wherein $R_1 =$ H, CN or an alkyl radical with 1–4 carbon atoms

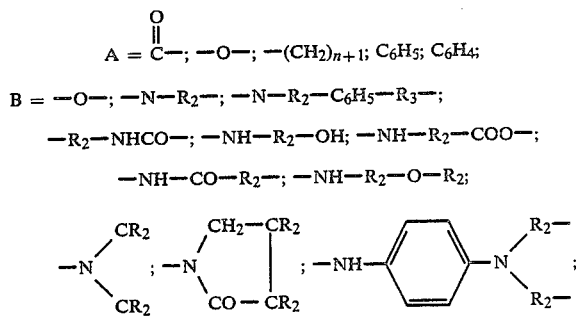

wherein
- $R_2 =$ terminal H, straight chain and branched acrylic groups, aralkyl groups, cyclic alkyl groups and acrylics containing 1 to 50 carbon atoms, preferably 1–20,
- $R_3 =$ terminal H, an alkyl group with 1 to 50 carbon atoms,

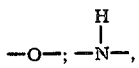

n = is an integer from 0 to 50, preferably from 0–10.

Particularly suitable as the hydroxyl group-containing polymer (a) is a derivative of cellulose, in particular a cellulose ester and/or cellulose ether with a reactive acrylic and/or methacrylic group content of at least 0.1 weight percent and an average molecular weight ($\overline{M}_w$) of between about 10,000 and about 250,000 and/or a phenol or novolak derivative with a reactive acrylic and/or methacrylic group content of $\geq 0.1$ weight percent, and an average molecular weight ($\overline{M}_w$) of between about 1,000 and about 50,000 and a glass transition temperature ($T_g$) of $\geq +20°$ C.

The thermoplastic backbone polymers for the melt compositions according to the invention, may be polymers and copolymers of starch and cellulose, which include cellulose esters, cellulose ethers, polyvinyl alcohols and their derivatized products which are attached to the hydroxyl groups, partially saponified polyvinylacetates and their copolymers, hydroxyacrylic polymers and copolymers, polyesters and copolyesters, with a minimum ethylenically unsaturated group content of $\geq 0.1$, preferably $\geq 0.2$, more preferably $\geq 0.5$ weight percent.

The thermoplastic, polymerizable cellulose esters and ethers according to the invention are derivatized products of commercially available cellulose esters and ethers with a compound carried by one of the above ethylenically unsaturated groups. The commercially available cellulose esters are marketed under the trade marks "CELLIT®", "CELLIDOR®" and should be formate, acetate, propionate, butyrate, capronate, stearate or mixed esters consisting of at least two of the related organic fatty acids. The cellulose ethers, on the other hand, can be alkyl, aralkyl and acrylic, hydroxyalkyl, carboxyalkyl- ethers or similar compounds. Moreover, mixed ethers and compound esters are also suitable, if they are able to provide certain characteristics to the melt composition according to the invention. It is important that cellulose esters and ethers be interchangeable with one of the previously described acrylic compounds and that they feature a post-reaction melting point of $\leq +300°$ C., preferably $\leq +250°$ C., especially $\leq +200°$ C.

The production of such polymerizable, thermoplastic cellulose esters and ethers has, for example, been disclosed in European Patent Application 0 146 277 and in Houben-Weyl "Macromolekulare Stoffe", Teil 2, "Umwandlung von Cellulose und Starke", 1963, S. 863–915 ("Macromolecular Substances", Part 2 "Transformation of Cellulose and Stärch", 1963, pp 863–915) in which attempts to graft other monomers and polymers to the cellulose molecule in order to create new types of plastic are described (p 894). This can be achieved, for example, by introducing polymerisable double bonds into the cellulose molecule, e.g. by etherification with allyl chloride or by forming radicals inside the cellulose molecule, e.g. through ozonization or irradiation of the cellulose. Cellulose polymers according to the invention include starch esters of organic acids, alkyl ethers and aralkyl ethers of starch. The latter can also have additional functional groups, a typical example being starch allyl ether, which can be polymerised with other allyl and vinyl compounds to produce cross-linking. Solutions of starch allyl ethers, which are known as feedstocks for lacquer production, are processed into inert organic solvents.

The use of these polymerisable, thermoplastic derivatized products of cellulose and starch also has an economic impact in view of the fact that world resources of cellulose and starch are not as limited as oil resources, from which the coreactants required to alter the derivatives of cellulose and starch are produced. Cellulose and starch, being natural substances, are therefore less environmentally noxious. Other suitable polymerisable, thermoplastic backbone polymers containing hydroxyl groups are polyvinyl alcohols and their derivatized products obtained by etherification, acetalization, ketalization and esterification, as well as a polymerisable group based on formula 1. Backbone polyesters can even be produced by transesterifying polyvinylesters, which may possibly already carry polymerisable, ethylenically unsaturated groups if for this purpose unsaturated carbon acids such as acrylic acid, maleic acid or their anhydrides are employed Such compounds are described in DE-AS 10 65 621.

Important in this respect, besides the acetals and butyrals are the alkyl vinyl ethers such as ethyl, n-butyl, isobutyl and octyl vinyl ethers which can also be polymerized by energy-rich radiation. Such reactions have already been described by J. G. Fee et al. in the Journal of Polymer Science 33, pg. 95 (1958).

Also known in the art are the light-cross-linking derivatized products of polyvinyl alcohol or other copolymerizates containing hydroxyl groups, maleic acid anhydrides, p-amino cinnamic acid esters and similar compounds as described, for example, in U.S. Pat. No. 2,811,509.

Other particularly suitable polymerisable, thermoplastic backbone polymers containing hydroxyl groups are compounds from the phenol, novolak and resorcinol groups carrying a polymerisable group according to formula 1. Such compounds can be made, together with bi-phenols and novolak epoxides (see e.g. H. G. Elias, Makromolecule (Macromolecules) Basel, Heidelberg, 1972, pp. 707–709) by means of derivatization in the presence of acrylic or methacrylic acid. Even derivatizations with (a) isocyanatoalkylacrylate or methacrylate; (b) addition compounds of di-, tri- or polyisocyanates or isocyanate prepolymers with low molecular weights with hydroxylalkylacrylates or hydroxyalkylmethacrylates; (c) glycidylacrylate or glycidylmethacrylate produce backbone polymers that carry a polymerisable group according to formula 1. These have a proportion of polymerisable groups of $\geq 0.1$ weight percent, an average molecular weight ($\overline{M}_w$) between about 1,000 and about 50,000, preferably about 1,000 and about 10,000, particularly about 1,000 to about 5,000 and have a glass transition temperature ($T_g$) of $\geq +20°$ C.

Their chemical structures correspond, for example, to the general formulae 2 to 4. Moreover, such novolaks are suitable, having been produced by the condensation of phenols with acetaldehydes, acetylenes, vinyl ethers and/or furfurol and carry at least one ethylenically unsaturated group based on formula 1.

All of the polymerisable straight chain polymers according to the invention and described herein must possess thermoplastic properties permitting their combination with the melt compositions according to the invention. The melting points in this connection are $\leq +300°$ C., preferably $\leq +250°$ C.; in particular $\leq +200°$ C., and possible monomer residues resulting from the derivatization with an ethylenically unsaturated residue from the previous formula 1 are present in a proportion below 0.01 weight percent, preferably below 0.001 weight percent and are themselves in particular free of low-molecular ethylenically unsaturated compounds with a mole weight $\leq 500$, preferably $\leq 800$.

These backbone polymers in particular determine the toughness, the chemical and thermal stability and water resistance of the hardened or cross-linked melt compositions proposed.

Components b) to be used according to the present invention are produced from saturated, linear or branched thermoplastic polyesters and their copolymers. These may be derivatized products of bi-and-multifunctional alcohols such as ethylene glycol, neopentyl glycol, hexandiol-1,6, trimethylolpropane, with aromatic acids such as phthalic-, isophthalic and terephthalic acids and possibly a proportion of condensed-in aliphatic dicarbonic acids. Such polyesters or their copolymers become reactive, polymerisable groups according to formula 1, and are either grafted to, or condensed into the molecule as it is being produced. The proportion of polymerisable groups contained is $\geq 0.1$, preferably $\geq 1.0$, in particular $\geq 1.5$ weight percent. The average molecular weights lie between about 1,000 and about 50,000, preferably about 1,000 and about 20,000, more preferably about 1,000 and about 10,000. The glass transition temperature is $\geq -50°$ C., preferably $\geq -30°$ C. The polymerisable polyesters and their copolymers may also feature a hydroxyl group number of between about 0.1 and about 10 weight percent. These furthermore have an acid number of between about 0 and about 100, preferably about 0.1 to about 50, particularly about 2 to about 20 mg KOH/polyester or copolyester. The COOH groups present in the molecule assume the role of adhesion promoter, whereby they improve the adhesion of the melt coating to metal substrates. Proportions of residual monomers present in the B components are about $\leq 0.1$, preferably $\leq 0.05$, in particular about $\leq 0.01$ weight percent. The melting points are $\leq +250°$ C., preferably $\leq +200°$ C., in particular $\leq +150°$ C. The production of the base polyesters and copolyesters has been amply dealt with in the literature, as has their modification with a residue of the present formula. In this connection see for example HOUBEN-WEYL, "Makromoleculare Stoffe", Teil 2: "Polycarbonsäureester", s. 1–44, 1963 ("Macromolecular Materials", Part 2: "Polycarbonic acid esters", p. 1–44, 1963).

The polymerisable polyesters and their copolymers may be amorphous, semicrystalline or crystalline.

The preferred base polyesters are according to the invention non-cross-linked and entirely linear, i.e. produced from unbranched main chains with branching determined by the trifunctional structuring of the main chain being comparatively slight, irrespective of the manner in which the alkyl side chains are bonded to the main chain by the ester and/or ether bonds. These polyesters are either entirely or primarily comb-like in structure, whereby the alkyl side chains extend outwardly from the essentially linear and unbranched main polyester chain in a regular, static arrangement. In this connection, the following may be employed as the starting material: aliphatic di-, tri- and higher polycarbonic acids, aromatic di-, tri-, and polycarbonic acids, dihydroxymonocarbonic acids and hydroxydicarbonic acids as well as mono and dialkylesters of the said di-and higher functional carbonic acids, mono- or dicarbonic acid esters of diols and higher polyols, or dimonocarbonic acid esters and mono- and dialkyl esters of mono- and dialkyl ethers of diols and higher polyols, as well as the monocarbonic acids and monoalkanols as such.

In the preferred polyesters, the mol ratio of the ester segments of the main chain to the side chains should be about 1 to from about 0.02 to about 2.0, in particular about 1.0 to from about 0.05 to 1.0. The glass transition temperatures ($T_g$) of these polyesters are in the region of $\leq +50°$ C., preferably $\leq +20°$ C., in particular $\leq +10°$ C. Viscosity values lie between 5 and 10,000 Pa.s at 120° C. In these new polyesters, the side chains exercise a singular effect upon viscosity, or rather molten viscosity since when the temperature increases slightly, the viscosity drops sharply.

The unexpected sharp decline in viscosity given an increase in temperature is according to the present invention as has been unexpectedly discovered, an essential prerequisite for the production of monomers and the additive-free melt compositions according to the present invention proposed for use in the food and pharmaceutical industries.

Functionalization of the polyesters with ethylenically unsaturated groups according to formula 1 may take place, for example, by derivatizing from about 10 to about 90% of the hydroxyl and/or from about 10 to about 100% of the carboxyl groups present in the polyester. Especially suitable as polymer b) is a base polyester carrying a hydroxyl group, which consists of:
(a) hydroxyl polyesters with branched chains consisting of polyester units, with branching at third and higher polyester-forming functions and/or
(b) hydroxyl polyesters with alkyl side chains possessing from about 2 to about 50 carbon atoms, preferably from about 4 to about 36 carbon atoms in the alkyl group, bonded by ester or ether groups of third or higher polyester-forming functions, containing ≧0.1 weight percent of reactive acrylic and/or methacrylic groups, with an average molecular weight ($\overline{M}_w$) of about 1,000 to about 20,000, preferably from about 1,000 to 10,000 and a glass transition remperature ($T_g$) ≦+50° C., preferably ≦+20° C.

Components (a) and (b) for the melt compositions according to the invention may be employed on their own or in combination with each other. Should components a) and b) be used in a composition, their proportions should be from about 99:1 to from about 1:99, preferably about 50:50, in particular from about 3 to 35:97 to about 65 weight percent. Since components (a) and (b) can cross-link with each other, the mole equivalents of reactable, polymerisable groups according to formula 1 play a partial role. In a number of applications, particularly the corrosion-and-abrasion-resistant finishing of steel or tin sheets, optimum metal adhesion is required as well as a high degree of toughness.

This requirement applies particularly to polymerisable melt compositions, which serve without the addition of additives, for the corrosion resistant finishing of substrates for the foodstuffs and pharmaceutical industries, and which furthermore can be applied to untreated surfaces Similar problems continue to affect technical application, for here, due to costs such as encountered in vehicle manufacture, surface pretreatment and degreasing cannot be performed. In order to be able now to meet these and other requirements, it has been demonstrated by the invention that, advantageously, both backbone polymers (a) and (b) must be represented in a melt composition if the backbone polymer (b) cannot alone meet the above-mentioned specifications. While flexibility and impact resistance can be influenced and controlled with the polymerisable straight chain polymers containing hydroxyl groups, such as the cellulose esters and ethers, with an average molecular weight ($\overline{M}_w$) of ≧20,000, preferably ≧30,000, the polymerisable, linear unbranched and/or branched polyesters, especially those with an acid number of ≧5 mg KOH/g, are responsible for metal adhesion and impact resistance. Due to the fact that this problem can preferably be solved only with polyesters and their copolymers with relatively low molecular structures, since they remain fairly fluid when molten, preferably those with molecular weights ($\overline{M}_w$) of from about 1,000 to about 10,000, in particular from about 2,000 to about 6,000, can be employed. These low melt viscosity values of the polyester and their copolymers are required for more rapid wetting with greater coverage, for, together with the adhesion promoters already incorporated in the molecule, e.g. carboxyl groups, they are responsible for producing optimal adhesion. This fact holds true especially in the case of tin sheet In some cases, the various polymerisable polyesters and their copolymers alone or combined in ratios of between from about 99:1 and from about 1:99 can be used as polymerisable melt compositions, as has been unexpectedly discovered.

This relates preferably to base polyesters and copolymers carrying hydroxyl groups, the former having average molecular weights from about 1,000 to about 20,000, in particular from about 1,000 to about 10,000 from the group consisting of
(a) hydroxyl polyesters with branched chains having branching at third and higher polyester-forming functions and consisting of polyester units and/or
(b) hydroxyl polyesters with alkyl side chains containing from about 2 to about 50 carbon atoms in the alkyl groups bonded through ester groups or ether groups of third or higher polyester forming functions,
(c) components are polymerisable oligomers carrying ethylenically unsaturated groups of acrylic, methacrylic, ester, ether, urethane, amide, imide, epoxide, siloxane, phenol, novolak and/or mercapto compounds, carrying at least one reactive group based on formula 1. The preferred reactive group capable of polymerisation is an unsaturated vinyl group, in particular an acrylic group. The oligomers have average molecular weights ($\overline{M}_w$) between about 400 and about 10,000, preferably between about 800 and about 6,000. At room temperature, they range from fluid to solid. Some of these oligomers exhibit "semicrystalline" characteristics, which indicate exceptional purity and tight molecular weight distribution.

The functions and purposes of component (c) in one of the melt compositions according to the invention is:
as a cross-linking agent;
as an adhesion promoter;
as a modifier for improving rheological properties, for instance melting- or, rather, the processing viscosity;
as a modifier for improving the end characteristics of the cured melt composition;
to promote variations in toughness, or rather flexibility;
to improve resistance against environmental influences, chemicals, acids, salts, etc.; and
to improve stability in heat and cold.

Examples of component (c) include oligomers carrying ethylenically unsaturated groups such as may be selected from the group consisting of pure acrylate and/or methacrylate; acrylic acid esters and/or methacrylic acid esters; polyesteracrylate and/or methacrylate; polyetheracrylate and/or polyurethane-acrylate and/or methacrylate; methacrylate; epoxide acrylate and/or epoxide methacrylate; polyacrylated polyols and/or polymethacrylated polyols; acrylated and/or methacrylated polytetrahydrofurane; acrylated phenols and novolaks and their derivatives and/or methacrylated phenols and novolaks and their derivatives; acrylated polycarbonates and/or methacrylated polycarbonates; acrylated polyamides and/or methacrylated polyamides; acrylated polyimides and/or methacrylated polyimides; acrylated melamine resins and/or methacrylated melamine resins; acrylated polysiloxane and/or methacrylated polysiloxane; acrylated polysulfide; and/or methacrylated polysulfide.

In addition, within the spirit of the invention, fumaric acid and/or maleic acid based-polyesters as well as acrylated and/or methacrylated diolefins such as polybutadiene can be used. Suitable as well for modifying the melt composition according to the invention are fluorine hydrocarbon substituted, ethylenic unsaturated group-carrying oligomers such as fluorine hydrocarbon substituted polyetherurethane acrylate. Particularly suitable are acrylated and/or methacrylated polyesterurethanes as described for example in DE-OS 29 14 982. Such acrylic or methacrylic group-carrying polyesterurethanes have a very tight molecular weight distribution and because of their purity and the absence of monomers can partially crystallize. The higher molecular types with a molecular weight $\geq 1.200$ possess at room temperature a wax-like structure and plasticization, or rather melting point of $\leq +100°$ C. These components not only cause the melt viscosities to be lowered but they can lend greater flexibility to the melt compositions according to the invention.

Further particularly suitable oligomers are the acrylated and/or methacrylated phenols, novolaks and their derivatives of the general formula:

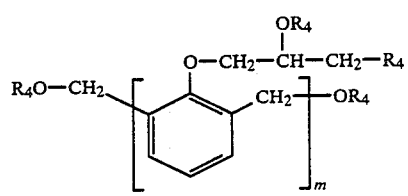

Formula 2 wherein
$R_4$ = terminal H and/or a residue according to formula 1,
n = an integer between 2 and 20 tween about 3:97, preferably about 50:50, in particular from about 20 to 30:80 to about 70 weight percent.

The first D components to be mentioned should be pigments, which colour the melt composition. By the term "pigment" are understood common colouring agents, colour producing compounds, fillers and extenders of all kinds, which in addition supply the melt compositions according to the invention with solids and render such compositions capable of holding an impression. At the same time, such pigments give the melt compositions a host of other specific properties.

Should these pigments be employed in melt compositions or anti-corrosion agents later to be used in the foodstuffs and pharmaceutical areas, such pigments must first meet statutory guidelines concerning foodstuffs. The properties and functions of such substances have already been documented in O. Lückert "Pigment und Füllstoffe", 2. Auflage, 1980, M. u. O. Lückert, Laatzen. (O. Lückert "Pigments and Fillers", 2nd edition, 1980, M and O. Lückert, Laatzen). The proportion of pigments and fillers present in the melt compositions according to the invention can range from between about 1 and about 80, preferably from about 10 to about 70, in particular from about 20 to about 60 weight percent, relative to the proportion of components (a) and/or (b).

For employment in the technical area, further additives such as stabilizers, antioxidants, leveling agents and surface active agents can be added to the melt compositions according to the invention.

The additives have been sufficiently dealt with in the

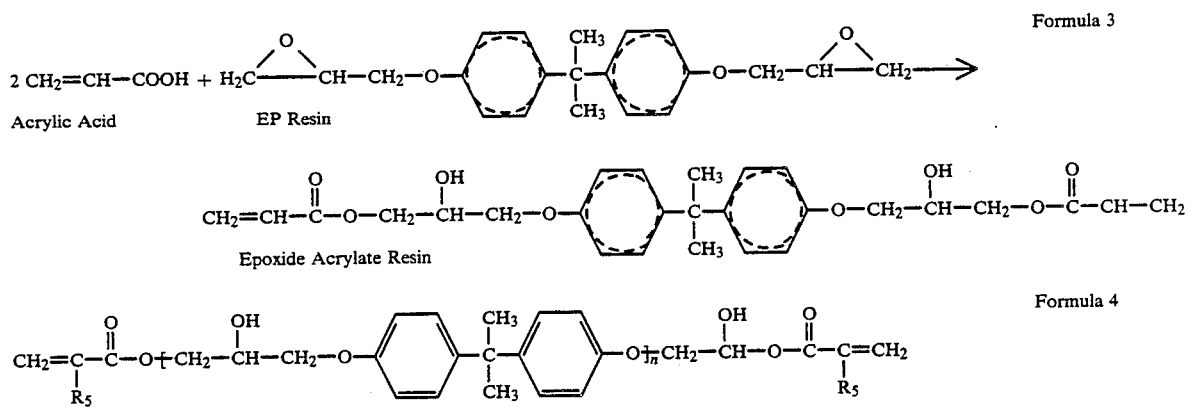

wherein
$R_5$ has a terminal H and/or the equivalent of $R_1$ in formula 1,
n = an integer from 1 to 2.

Such phenol group-containing compounds in accordance with the invention can regulate thermal, sterilization and chemical stability of the melt compositions of the present invention, which in the case of packed product in the food and pharmaceutical industries, are essential.

Addition of the (c) components depends on the given melting and process temperatures of the backbone polymers employed. Their addition enables the melt and processing viscosity of the melt compositions of the present invention to be reduced, in that the oligomer remains thermostable in this temperature region.

The oligomers have a residual monomer content of $\leq 0.5$, preferably $\leq 0.05$, particularly $\leq 0.01$ weight percent. The ratios of components A and/or B are beliterature; the reader has thus only to refer to Gächter/Müller "Kunstoff Additive", 2. Ausgabe, Hanser Verlag, München, 1983 (Gächter/Müller "Additives in Plastics", 2nd edition, Hanser Verlag, München', 1983). The additive content in the composition ranges generally from between about 0.1 to about 5.0, preferably from about 0.1 to about 2.5 weight percent relative to the finished melt composition.

In the foodstuffs and pharmaceutical areas only, such leveling and surface acting agents can be used provided that they contain at least one polymerisable double carbon and/or triple bond in the molecule and thus are capable of being chemically bonded with the cured melt composition matrix. Examples of such surface acting agents and leveling agents are, e.g. oxyethylated 2,4,7,9,-tetramethyl-5-decin-4,7,-diol of the general formula

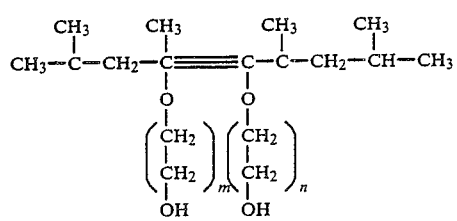

formula 5 m = an integer between 1 and 20,
n = an integer between 1 and 20.

Even the siliconacrylates employed according to the invention from the group of (c) components can assume the role of a leveling, surface active and/or anti-foaming agent.

A further objective of the invention is that of producing the melt compositions according to the invention, in particular those destined for use in the foodstuffs and pharmaceutical sectors and which therefore do not contain additives such as stabilizers or antioxidants.

Polymerisable unsaturated cellulose esters and ethers from the group of (a) components, which carry ethylene groups and contain hydroxyl groups are especially thermosensitive. This fact should explain why polymerisable cellulose polyesters in the European Patent Application 0 146 277 and in the European Patent Application 0 184 349 are caused to undergo reaction at $\geq +120°$ C. and $\geq +80°$ C. respectively and in an inert vehicle. Furthermore, the cellulose esters and ethers can feature a high proportion of adhesing atmospheric oxygen. Since as thermoplastics such esters and ethers are thermosensitive, thermic oxidation and hence the degradation of the cellulose molecule is accelerated in the presence of atmospheric oxygen, which leads to the rapid development of crack-products. Such crack-products not only discolour the melt compositions, turning them from brown to black, but can also produce physiologically harmful effects. Preparation of the raw material resulting in the melt compositions of the present invention should therefore not only take place inside an atmosphere of inert gas, but, unexpectedly, it has been discovered to be advantageous if the backbone polymers which carry hydroxyl groups which:

- are pre-rinsed or prewashed with inert gas, and/or
- are degassed in an aqueous suspension, if necessary under vacuum, in order to remove atmospheric oxygen. If degassing in an aqueous suspension has been performed, the first phase of the melt down process must include predrying at a temperature approximately 10° C. below the melting or plasticization point of the backbone polymer.

By contrast, the hydroxyl group-containing polyvinyl alcohol, phenol and novolak derivatives, as well as the polyesters and their copolymers are not nearly so thermosensitive and susceptible to thermooxidation. Nevertheless, similar care should be exercised during their preparation in order to obtain polymerisable melt compositions free from crack-products. However, washing with inert gas and/or vacuum degassing may be dispensed with in general since these substances are already degassed when supplied.

Prior to reaching the so-called main melting phase, the hydroxyl group-containing backbone polymers are prewarmed to their melting or plasticization point. Next, the temperature is raised +20° C. to +60° C. above the melting or plasticization point in order to bring the composition rapidly to a molten, homogeneous state. As soon as the melt becomes homogeneous and free of hard bits and pieces, component b) and if required, component (c) is added. Components (b) and (c) should be brought to temperatures at least as high as the melting or plasticization point of the backbone polymers containing the hydroxyl groups. A lower temperature presents problems for a continuous process inasmuch as through cooling, the viscosity and hence the cohesive resistance in the developing melt composition would increase, which could lead to degradation. Even the (d) component is desirably pre-warmed before being introduced into the composition. If inorganic pigments and fillers are to be added, these should also be warmed to the process temperature so that they can be quickly and without difficulty integrated into the composition. Finally, a degassing procedure may be carried out in a vacuum at pressures up to $10^{-1}$ Torr. The finished melt composition may continue on an in-line basis to be processed further, or in an off-line process, the composition can be cooled down and if required, formulated into granules. In order to prevent thermal oxidation, such a process must take place in the presence of an inert gas. Nitrogen ($N_2$), Carbon dioxide ($CO_2$), and similar gases can be used as the inert gas.

Continuous Processing

For the continuous processing of feedstocks used to produce the melt composition according to the invention, an extruder comprising at least one worm is used. Components A and/or B-preferably pre-warmed- are poured into the extruder as the first raw materials. Component (b), and if required, component (c) is then melted or prewarmed and added to the already molten melt composition. Should the addition of the component (d) be required, it is also most preferably prewarmed and integrated in the last processing portion of the extruder.

Processing temperatures and times are primarily determined by the plasticization and melting points of the raw materials used. The metered feed of the individual raw materials or mixtures/aggregates of the same can, in the case of solid materials, be carried out by using weight and gravity-activated metering devices while in the case of liquids, by means of metering pumps. The entire process should ideally be controlled by microprocessor. Mixing times, however, should be set at $\leq 10$, preferably $\leq 5$ minutes in order to exclude the possibility of heat loss. The procedure may, if required, be carried out under an atmosphere of inert gas.

Preparation of the raw materials for the additive and monomer-free melt compositions of the present invention for the food and pharmaceutical industries must definitely occur within an inert gas atmosphere in a continuously operating extruder so as to minimize thermal damage to the greatest possible extent. The so-called "Ko-Kneters" (Ko-kneaders) are particularly suitable for production with short mixing times.

The homogeneous, hot melt composition may, after vacuum degassing has been performed, either be (a) pumped directly to a coating or application area, or (b) cooled and granulated or poured into barrels.

Discontinuous Processing

Discontinuous processing of the raw materials used for producing the melt compositions according to the invention may (a) take place in a melt kneader with two Z mixing arms employed for mixing purposes and a worm extrusion device and (b) for low and medium viscosity products, may take place in a melt dissolver. Both mixing apparatuses can be heated and for the purpose of removing gasses used in processing, a vacuum system can be utilized.

In this process as well, the (a) and (b) components are placed in the melt kneader first. As soon as these components have been prepared, the remaining solids, if desired are pre-warmed, and then added. Finally, any liquid additives are worked-in and integrated homogeneously into the mass. Thereafter, the melt composition is degassed under a vacuum, and then further processed as outlined above in the continuous processing method.

The optional granulation in an off-line system, may be carried out, if required, by producing ropes or strings by cooling techniques and then by cutting the ropes/strings thus produced.

A further feature of the invention is the finishing of a substrate with the polymerisable melt compositions of the invention. The polymerisable melt compositions according to the invention are suitable for forming corrosion-and-abrasion resistant coatings and/or development of a coating film with barrier properties for e.g. the following planar substrates and formed bodies:
 (a) Metals such as: steel sheets of all types, tin plate, aluminum sheet and foil, copper sheets and foil, and similar materials;
 (b) cellulose materials such as: paper, cardboard and paperboard of all kinds, wood chip and wood fibre board, plywood, wood boards and similar materials;
 (c) plastics such as: films and sheets made of e.g. polyvinyl alcohol, polyethylene, polypropylene, polycarbonate, polyvinylhalogenide, polyester, polyamides and their copolymers fibre composites of thermo- and pressure-setting plastic; and
 (d) inorganic materials such as: cement and gypsum sheets including sheets of fibre composites, glass and similar materials.

The above list of substrates is not complete and serves only to illustrate that with the polymerisable melt compositions of the invention, a large number of materials can be rendered corrosion-and-abrasion resistant and/or be finished with a protective film.

In many commercial and industrial sectors, the above-mentioned and other substrates may be required to undergo a final process that renders them resistant to corrosion and abrasion, and/or that coats them with a protective film. Such industries are the packaging material and the packaging industry, the motor vehicle, aviation and shipbuilding industries, the wood products industry and producers of exterior sheeting and siding for buildings.

The additive-free or low additive, or monomer-free or low monomer polymerisable melt compositions are particularly suited for use in the packaging material and packaging industries for the food and pharmaceutical products industries. Packaging materials supplied to such industries will, in the future, not only have to be produced under more stringent quality control regulations, but such packaging materials will also have to meet the higher requirements of the food products and pharmaceutical industries in terms of their physiological and sensory performance and characteristics. In order for this objective to be reached, new coating materials will be required to be produced and processed by a different technology. This objective can be realized in the packaging materials and packaging industry by the use of the solvent, additive and monomer polymerisable melt compositions according to the present invention. The application technology required for this purpose is thus a further feature of the invention.

To this end, differences in properties will have to be recognized between metal, plastic and cellulose-containing packaging substrates or materials. Particular attention must be paid to metallic packaging materials, since they are particularly susceptible to corrosion relative to the packaged product and also to the environment should the substrate surfaces or connecting surfaces not be adequately protected. A publication by H. Kolb, in "Herstellung and Prüfung von Konservendosen", Fleischwirtschaft 63 (9), 1983, s. 1373–1382 (Production and Quality Control of Conserve Tins, Fleischwirtschaft 63 (9), 1983, S. 1373–1382), deals with the production and inspection of preserving tins and the critical parameters involved. Reference may be made to this article for further information on this point.

In the production of preserving or canning tins, aluminum, steel and tin sheet in thicknesses of 0.15 to 0.35 mm are generally used. Tin sheets are frequently provided several times with an anti-corrosion layer of pure tin. Nonetheless, the tin cans must also generally be coated with a corrosion-resistant lacquer. Although aluminum, as opposed to tin sheets, possess some positive characteristics, it is additionally necessary to coat the inside and outside of this material with lacquer in order to prevent "pit formation". This phenomenon occurs in the presence of packaged products having low pH values, and includes fish products and soft drinks.

With respect to the production of metal tins, a distinction should be made between: (a) a three-part tin consisting of the body with a side seam, a bottom and a cover, and (b) a seamless, two-part tin consisting of flattened and/or deep drawn bodies and a cover.

Since covering with a suitable corrosion-and-abrasion resistant coating material takes place before as well as after the deformation stage in the production of tins, special anti-corrosion materials are required. Particularly high demands are made of the coating material if the deformation stage is to occur after the metal substrate has been finished with a corrosion-and-abrasion resistant coating material. In such finishing systems, coating materials are required that possess a high degree of flexibility and toughness, while also possessing good adhesion characteristics on the contact surface thereof. Furthermore, the porosity of the coating film—particularly in the case of low film thicknesses—should not be permitted to increase so as to prevent a substantial loss of corrosion resistance. In order to be able to meet these and other requirements with the melt compositions according to the invention, it was unexpectedly discovered that backbone polymers are required which, due to their structure, can readily achieve this purpose. A preferred example of such backbone polymers according to the invention are the polymerisable cellulose esters and ethers as well as the functionalized polyesters and their copolymers possessing a "comb-like structure". By adding these straight chain polymers in proportions of $\geqq 3$ weight percent, preferably $\geqq 5$ weight percent, and most desirably $\geqq 10$ weight percent, coating materials can be produced, which according to the Erichsen Test, can be deep drawn up to 15 times their length. At the thickness values given above, the sheet metal would be the first to rupture or tear under deep drawing.

Similar requirements have also been made where bodies or products formed from planar plastic substrates or materials are finished with a corrosion-and-abrasion resistant protective and/or barrier film are produced. In these applications, the polymerized melt compositions should possess a high degree of flexibility, particularly whenever hollow bodies are produced from the melt-composition coated substrates by a deep drawing method.

A further feature of the invention is the preparation and finishing of planar substrates and formed bodies with the melt composition according to the invention. With regard to processing the melt composition according to the invention, a distinction should be drawn between an - in-line operation, and an - off-line operation. The in-line system has the advantage that the prepared melt composition is worked immediately after it is prepared and therefore does not have to undergo a second melting operation. This fact provides significant advantages for thermo-sensitive melt compositions, in particular those which do not contain either stabilizers or antioxidants, since the thermal load is relatively short-lived and the danger of degradation product formation is relatively remote. This system is, in addition, more economical and furthermore, the "heat history" of the plastic materials is not able to cause additional problems in the system.

In the off-line operation, the granulates may be premelted inside a low-pressure melting tank. The premelted mass, inside the melting tank, may then flow to a main melting phase or stage and from this point, it may be is pumped by e.g. a gear pump through heated conduits to an application device.

Where barrels or the like are to be sealed, the melt compositions may be melted by means of a barrel sealing apparatus fitted with a heatable plate and a gear pump and then pumped through heated tubes to the application device. The advantage of both systems is that only as much melt composition is melted down as is consumed or dispensed by the application device. Both systems employ conventional technology.

On one hand, since the melt compositions according to the present invention have a relatively high viscosity at application temperatures and on the other hand during polymerisation, e.g. through free radicals or by means of UV or electron irradiation in the presence of atmospheric oxygen can feature reaction inhibition on the surface, it has unexpectedly proven advantageous not only to cover the melt composition to be applied with an inert gas but with the latter to create a foam which leads to the formation of a melt composition foam whose viscosity is also lower. Thus, the melt compositions can not only be diluted with an inert gas, but in addition to being protected against decomposition due to thermal oxidation, can be protected against oxygen inhibition. Foam processes are known from the literature, e.g. from Larry Trevathan, NORDSON CORP., entitled "Foam Technology in Adhesives and Sealants", TAPPI Hot Melt symposium, Hilton Head, S.C., June 1–4, for inert, physically setting melt adhesives, whose role is primarily that of reducing the amount of melt adhesive to be applied to surfaces and edges of materials.

An unexpected discovery of the present invention is that when planar substrates with band widths of up to 3 meters are being finished e.g. by a coil coating technique, the "diluted" melt composition created by the foam has the additional advantage that the flow levelling and wetting properties of the melt compositions are considerably improved. Even when a spray method is used to apply the melt composition according to the invention, the creation of a foam by using inert gases is a great advantage, as has been surprisingly discovered.

Such inert gas can be $N_2$, $CO_2$ etc., and according to the invention can be pre-warmed to the application temperature of the melt composition before being combined with the melt composition. The porosity or, rather, the foam structure also affects the controllable rheological characteristics of the melt composition.

Where low coating weights are involved, in order to achieve the appropriate application viscosity on top of the substrate, which in turn is necessary in order to achieve optimal wetting over the entire surface to thereby obtain adhesion, and particularly where high application speeds are employed, the substrates should also be prewarmed. If the warm or hot melt compositions are applied to a cold substrate surface at room temperature, the composition at the boundary surface or interface between the substrate surface and melt composition would cool excessively and thus not ensure complete wetting or adhesion to the entire surface. The wetting angle of a substrate depends upon the viscosity of the coating material used.

With respect to the pre-warming of the substrates, it is necessary to distinguish between different types of substrates. However, it is most preferred that all types of substrates should be pre-warmed to at least $\geq +50°$ C. in order to retard the heat loss from the melt composition.

It has also been discovered that it is advantageous to pre-warm metal substrates to the application temperature of the melt compositions. The pre-warming process feature can take place, according to the invention, either before or after the application of the melt composition by means of inductive warming and/or direct heating by flame treatment to the substrate. The surface may, naturally, also be pre-warmed by either a hot air stream or infrared light. The inductive pre-warming technique is not only economical, but permits the desired temperature to be reached during a shorter pre-warming phase under more precise microprocessor control.

Plastic substrates, on the other hand, must not be heated up to such a degree, because thermoplastic substrates soften rapidly. Depending on the type of substrate, such as e.g. PE, PP, PVC etc., the pre-warming phase should occur at 10° C. below the plasticization point. When non-polar substrates are to be coated, surface treatment by flame or corona discharge can improve wettability and therefore adhesion. It is particularly advantageous, however, to use surface flame treatment techniques employing e.g. a propane gas flame, which in addition to achieving the desired degree of pre-heating of the surface, is very economical.

In order to finish these substrates, it is advantageous to use melt compositions according to the invention that feature relatively low processing temperatures. In contrast to the process used to coat metal substrates, the counter-pressure drum should cool in the direction of application, so that once the entire surface has been wetted, potentially injurious heat can rapidly be drawn off from the plastic substrate and the melt composition.

Preheating of substrates of cellulose and inorganic materials should be carried out taking into consideration the thermo-sensitivity of these materials. It is, however, advantageous to pre-heat these materials to ≧ +100° C.

The melt composition according to the invention can be applied by means of any of the following application equipment:—heated multi-roller application equipment;—slotted nozzles or blades;—spray guns;—or other similar equipment. When a melt composition foam is being applied, the drum slots should have variable adjustments since the melt composition foam is dissipated only at the smoothing roller (i.e. the counter-pressure roller).

Polymerisation, i.e. curing or cross-linking of the melt compositions according to the invention takes place immediately after the planar substrates or the formed bodies have been finished with the melt compositions. This polymerization process can take place using a free radical method involving e.g. peroxide and hydroperoxide initiators in the presence of heat, or by means of UV or electron radiation. A unique and preferred form of polymerization is that using electron radiation, particularly if the melt composition according to the invention is to be employed in the coating of substrates destined for use in the foodstuff and pharmaceutical industries. The use of the electron beam technique permits polymerization i.e. curing or cross-linking to take place without the use of reaction initiators such as peroxides, photosensitizers and/or amine-containing synergists. At the same time, the electron rays serve to sterilize the substrate surface.

A further feature of the invention is that of polymerizing and curing the polymerisable melt composition according to the invention. In an uncured state, the melt compositions according to the invention feature thermoplastics which only through polymerization and curing can be transformed into products having duroplastic properties. The melt compositions, depending on their composition, form specific polymer matrixes which permit them to achieve the characteristics and features described herein.

High standards for polymerization and curing have been achieved for curing of the polymerisable melt composition according to the invention, particularly for the foodstuff, pharmaceutical and high performance industries such as vehicle manufacture. Besides outlining clearly definable inert gas and/or protective film conditions, standards relating to reaction kinetics are considered to be very important, in order to ensure the continuity of high performance standards whenever this method is used.

In the curing or polymerization phases, atmospheric oxygen has an inhibitory effect on the polymerisable melt composition since the radicals that form during the process combine more rapidly with atmospheric oxygen molecules than with ethylenically unsaturated groups. The effect of this situation is that short-chain polymerisates, which are soft and sticky, form only on the surface, the latter of which are neither scratch-nor solvent resistant. It is thus necessary for the curing i.e. polymerization stage to occur within an inert atmosphere so that known inert gases such as $N_2$ and $CO_2$ are employed. Since the cost of using inert gas for this procedure may vary, a new method has been described in DE-OS 29 49 710 the teachings of which are hereby incorporated by reference; in this method water takes over the role of the inert gas in creating an inert processing phase on the surface. The water is applied as a protective layer to the lacquer surface before and/or after cross-linking. Since the film of water is produced by means of a spray gun, it is not always homogeneous. It is therefore necessary, particularly in the case of hydrophobic lacquer surfaces, to add to the water, a substance that reacts on the surface so as to create a wetting angle that permits wetting of the entire surface. At the same time, the surface-active wetting agents, particularly when applied with a spray gun, can foam when in the aqueous phase. This method permits control of surface hardening. Since the surface-active substances suitable for these purposes are not always physiologically innocuous and/or can negatively affect the sensory qualities of a packaged product, coating films cured under such conditions can not be employed in the foodstuff and pharmaceutical fields.

Although pure water could be an ideal protective film during the curing and polymerization stages, especially if such procedures involved the use of electron rays, the technology described in DE-OS 29 49 710, at least for the production of corrosion-resistant packaging materials for use in the foodstuff and pharmaceutical industries, is either not suitable for or has not been sufficiently developed to ensure even curing of coating films.

In the search for an improved means of producing a protective film of potable or desalted water, a method was discovered for producing such a water film from an atmosphere containing high relative humidity. Since the applied hot polymerisable melt compositions of this invention, and the underlying substrates must be cooled, the quantity of heat thus available can be used to create an atmosphere having a high relative humidity. Before the warm (or hot) coated substrates enter the polymerization-or curing room-or chamber, cold potable or desalinated water may be sprayed onto the hot surface, causing the water to evaporate, producing high relative humidity atmosphere. At the same time, the coated substrates are cooled off in order to cause water from the high relative humidity atmosphere to condense out upon the uncured surface of the melt composition. This condensation serves as an ideal protective film, as has been found with this invention, since in comparison to a film created by spraying water, such condensation remains for a short time in a very thin and homogeneous film on a hydrophobic surface while temporarily possessing "polymer characteristics".

This method, which is an objective of the invention, plays an important role in ensuring that the protective water film formed above the existing dew point provides a consistently high cross-linking density even during rapid curing and polymerization and a surface free of foreign matter.

After curing and polymerization, the remaining dew or water condensate can be blown off with hot air and/or caused to evaporate with the aid of other energy sources, such as infrared rays.

The curing or polymerization of the polymerisable melt composition according to the invention takes place through a free radical polymerization in the presence of reaction initiators from the peroxide group, e.g. benzoylperoxide, hydroperoxides, e.g. cumenehydroperoxide and many others; or actinic light especially UV radiation in wavelengths from 380 to 100 nm in the presence of photoinitiators such as e.g. benzophenone, benzoin ether, Michler's ketone, methylthioxanthone, ketals, and if required further synergists such as amines, tertiary amino alcohols; and/or by means of electron radiation in the low-energy acceleration range from 150 to 300 keV and a preferred, effective penetration depth from 3 to 400 g/m², as well as a dose of from 0.5 to 10 millirads, in particular 1.0 to 6.0, and dose scattering of approximately ±10%, preferably ±3%.

BRIEF DESCRIPTION OF THE DRAWINGS

The finishing of substrates and formed bodies with the melt compositions according to the invention is shown in the drawings, illustrating preferred embodiments and in which the figures shown are

Figure 1:
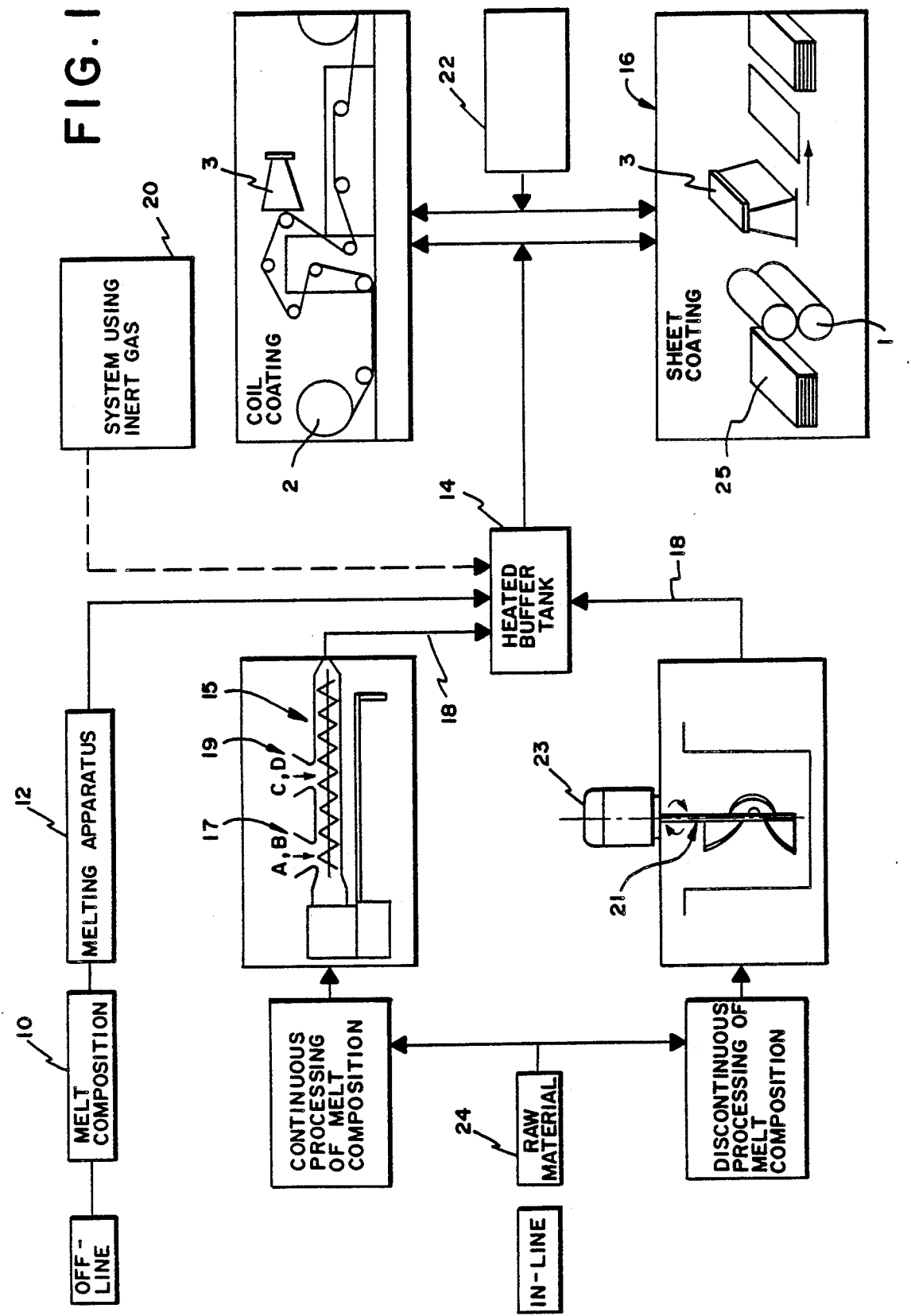
FIG. 1 is a schematic diagram showing processing according to the present invention for one embodiment.

Reference to the detailed features of the drawing will be made herein after, which show different combinations of the process used in the present invention to meet different technical requirements.

In the production of formed bodies or products using coated substrates, various process parameters exist that critically affect the functions and properties of the processed material. One such critical process parameter is that of deformation depth. In order to be able to meet such criteria with the melt compositions of the present invention, for instance in cases where the stretching ability or extensibility of the cured coating no longer corresponds to the deformation depth of the carrying material, the process parameters applicable hereto, as has been unexpectedly discovered, can be modified.

It is thus a further feature of this invention, in accordance with the teaching of the melt compositions described herein, to further develop finishing and deformable materials capable of meeting industrial requirements. This can be satisfied according to this invention in that the planar substrates are finished with one of the melt compositions of the invention, which melt composition(s) are subsequently polymerized or cross-linked with free radicals by heat or by radiation, the substrate deformed and the coating material completely cross-linked or hardened on the thus formed body by means of free radicals and/or radiation.

DESCRIPTION OF THE PREFERRED EMBODIMENTS

The invention will be described in greater detail in the following examples, without being limited thereto.

The preferred backbone polymers are listed below in Tables 1 and 2.

TABLE 1

Celluloseester PHYSICAL DATA

| | Molecular Weight | | Glass-Transition Temp. (Tg) °C. | Melting Point °C. | Ethylenically Unsaturated Group Content Parts By Weight % | OH-Number Parts By Weight % |
|---|---|---|---|---|---|---|
| | $\overline{M}_w$ | $\overline{M}_2/\overline{M}_n$ | | | | |
| Celluloseester 1 | 250,000 | 16.7 | 174 | 240–260 | 0.1 | 3.2 |
| Celluloseester 2 | 65,000 | 3.1 | 181 | 270–280 | 0.2 | 3.2 |
| Celluloseester 3 | 36,000 | 4.5 | 95 | 110–125 | 0.8 | 1.1 |
| Celluloseester 4 | 185,000 | 18.5 | 118 | 155–165 | 0.6 | 1.4 |
| Celluloseester 5 | 43,000 | 2.2 | 137 | 188–210 | 3.0 | 2.8 |
| Celluloseester 6 | 61,000 | 2.8 | 118 | 150–160 | 3.0 | 3.8 |
| Celluloseester 7 | 52,000 | 2.5 | 131 | 180–200 | 1.2 | 2.8 |

TABLE 2

Copolyester PHYSICAL DATA

| | Molecular Weight | | Glass-Transition Temp. (Tg) °C. | Acid No./OH-No. mg KOH/g | | Viscosity 120° C. Pa.s | Ethylenically Unsaturated Group Content Parts By Weight % |
|---|---|---|---|---|---|---|---|
| | $\overline{M}_w$ | $\overline{M}_w/\overline{M}_n$ | | | | | |
| Copolyester 1 | 2,000 | 2.9 | −10 | 8 | 9 | 8 | 1.8 |
| Copolyester 2 | 4,000 | 3.5 | +10 | 6 | 7 | 14 | 1.4 |
| Copolyester 3 | 3,000 | 3.2 | +10 | 6 | 8 | 13 | 1.6 |
| Copolyester 4 | 18,000 | 4.2 | +20 | 0 | 4 | 330 | 0.8 |
| Copolyester 5 | 5,000 | 2.8 | +20 | 5 | 8 | 20 | 1.5 |
| Copolyester 6 | 27,000 | 3.8 | +10 | 7 | 1 | 72 | 1.0 |

EXAMPLE 1

40 parts by weight of cellulose ester #3 (above) are placed inside a double-walled melt-kneader (mixer) possessing two Z kneading arms The kneader is closed and the mixing chamber and the cellulose ester are treated for two minutes with nitrogen The melt-kneader is next heated to +145° C. and the cellulose ester is kneaded until it forms an homogeneous, soft mass To this molten mass, there is now added 60 parts by weight of the premolten copolyester #1 (145° C.) which is worked into a homogeneous mixture at this temperature. Finally, the mass is degassed under a vacuum of −0.5 bars.

EXAMPLE 2

5 parts by weight of cellulose ester #1 are suspended in 50 parts by weight of water and then placed under a vacuum of −0.8 bars to remove adhering atmospheric oxygen. Next, the water is separated from the cellulose ester by means of a suction filter The moist cellulose ester particles are now fed into the melt-kneader (pre-warmed to +250° C.) where they are dried for a short time Subsequently, the mixing chamber is rinsed with nitrogen gas; the cellulose ester is plasticized in the resulting inert atmosphere Into this hot, plastic molten mass there is worked 95 parts by weight of pre-warmed cellulose ester #4 until homogenization is achieved, whereafter the oil bath temperature is reduced to +180° C. to produce a product temperature of approximately +160° C. As soon as an homogeneous melt composition is obtained, the latter is degassed under a vacuum at −0.1 bar.

EXAMPLE 3

70 parts by weight of a polyesterurethane acrylate, made from monomers consisting of 1 mole of hydroxyethylacrylate, 6 moles of epsilon caprolactone and 0.33 moles of hexamethylenediisocyanide, with a molecular weight of 1,800 and a melting point of +52° C., are heated to 130° C. inside a double-walled tank with a stirring dissolver apparatus heated by means of an oil bath With the dissolver running (5,000 rpm), 30 parts by weight of cellulose ester #6 (pre-heated to +110° C. in the drying chamber) are then worked in and the resulting mixture is processed by the dissolver until all cellulose particles have been dissolved. During the cooldown period, the melt is degassed under a vacuum of −0.5 bar.

EXAMPLE 4

60 parts by weight of acrylate novolak with a molecular weight of 2,100, a melting point of +105° C. and an acrylic group content of 0.5%, are melted at +150° C. in the melt dissolver described in Example 3 As soon as the material has been melted into an homogeneous mass and a temperature of +150° C. reached, 40 parts by weight of the pre-warmed cellulose ester #7 are mixed in. After the cellulose particles have been dissolved, the melt is degassed under a vacuum of −0.5 bar.

EXAMPLE 5

Following the same process procedures as described in Examples 3 and 4, 40 parts by weight of an acrylate novolak, molecular weight 1,700, melting point +92° C. and 0.4% double bonding content, are melted at 120° C. At this temperature, there is added 60 parts by weight of copolyester #4 pre-heated to +120° C., which is homogeneously blended in and degassed under a vacuum.

EXAMPLE 6

By any of the process procedures described in Examples 1 to 4, copolyesters #1 and #4 were melted together at +120° C. and degassed under a vacuum In the following Examples 7 to 21, (Table 3), melt compositions according to the invention from the group consisting of polymer A, polymer B and/or oligomer C, are described. The raw materials may be prepared according to one of the techniques described in Examples 1 to 6.

TABLE 3

| RAW MATERIAL | EXAMPLE #/PARTS BY WEIGHT |  |  |  |  |  |  |  |  |  |  |  |  |  |  |
|---|---|---|---|---|---|---|---|---|---|---|---|---|---|---|---|
|  | 7 | 8 | 9 | 10 | 11 | 12 | 13 | 14 | 15 | 16 | 17 | 18 | 19 | 20 | 21 |
| Polymer A | | | | | | | | | | | | | | | |
| Celluloseester 1 | 2 | — | — | — | — | — | — | — | — | — | — | — | — | — | — |
| Celluloseester 2 | — | — | 3 | — | — | — | — | — | — | — | — | — | — | — | — |
| Celluloseester 3 | 8 | 10 | — | 25 | — | 25 | — | — | 5 | — | — | 60 | 30 | — | — |
| Celluloseester 4 | — | — | 7 | 10 | 5 | — | — | — | — | — | — | — | — | — | — |
| Celluloseester 5 | — | — | — | — | 15 | — | — | — | — | — | — | — | — | — | — |
| Celluloseester 6 | — | — | — | — | — | 15 | — | — | — | 30 | — | — | — | — | — |
| Celluloseester 7 | — | — | — | — | — | — | 20 | — | — | — | 55 | — | — | — | — |
| Polyvinylalcohol MG 18,000 0.3% Acrylic Groups | — | 10 | — | — | 5 | — | — | — | 5 | — | — | — | — | — | — |
| Novolak Acrylate MG. 1,500 | 10 | — | — | — | — | 20 | — | 20 | 50 | — | — | — | — | — | — |
| Polymer B | | | | | | | | | | | | | | | |
| Copolyester 1 | 80 | — | — | — | — | — | 60 | — | — | — | — | — | — | 30 | — |
| Copolyester 2 | — | 80 | — | — | — | — | — | — | — | — | — | — | — | — | — |
| Copolyester 3 | — | — | 90 | — | — | — | — | 80 | — | — | — | — | — | 50 | — |
| Copolyester 4 | — | — | — | — | 70 | — | — | — | 15 | — | — | — | — | 20 | — |
| Copolyester 5 | — | — | — | 65 | — | — | — | — | — | — | — | — | — | — | 30 |
| Copolyester 6 | — | — | — | — | — | 30 | — | — | — | — | — | — | — | — | — |
| Oligomer C | | | | | | | | | | | | | | | |
| Bisphenol-A-diacrylate | — | — | — | — | — | — | — | — | — | — | 45 | — | — | — | — |
| Siliconacrylate MG. 1,200 1.2% Acrylic Groups | — | — | — | — | 5 | — | — | — | 25 | — | — | — | — | — | — |
| Polyesterurethane according to Example 3 | — | — | — | — | — | 10 | 20 | — | — | 60 | — | 30 | — | — | — |
| Polyimideacrylate MG. 900 | — | — | — | — | — | — | — | — | — | — | — | — | 10 | — | — |
| Polyamideacrylate MG. 1,100 | — | — | — | — | — | — | — | — | — | — | — | — | — | 20 | — |
| Polyetheracrylate MG. 700 | — | — | — | — | — | — | — | — | — | — | — | — | — | 50 | 70 |
| Mercaptoacrylate MG. 1,600 | — | — | — | — | — | — | — | — | — | 10 | — | — | — | — | — |

EXAMPLE 22

80 parts by weight of the melt composition from Example 1 are melted at +150° C. inside a melt kneader with two Z kneading arms; subsequently 20 parts by weight of pre-warmed (to +100° C.) titanium dioxide (0.1 to 0.3 microns) are homogeneously mixed in, and finally, the melt composition is degassed under a vacuum of −0.5 bar. The mixing phase takes place under an inert gas atmosphere using nitrogen.

EXAMPLE 23

The finishing of substrates and formed bodies with the melt compositions according to the invention is demonstrated using planar substrates in the drawings, which will now be described in further detail.

Referring to FIG. 1 initially, there is illustrated continuous and discontinuous apparatus and a system for processing the melt composition As shown in FIG. 1, a melt composition source 10 is fed to a melting apparatus 12, and then to a heated buffer tank 14. From there, the melt composition may be fed directly to application equipment indicated generally by reference numeral 16 for applying the melt composition to a substrate, and which is described hereinafter in greater detail In this equipment, a supply or source of sheet material to be coated is indicated by reference numeral 25, which are in the form of individual sheets as opposed to the coil arrangement representing a continuous source of material.

As illustrated in the schematic drawing of FIG. 1, there are two systems illustrated, one being continuous and the other being discontinuous In either case, melt feed from the continuous or discontinuous system is fed to the buffer tank 14 through appropriate conduits e.g. conduit 18.

FIG. 1 also illustrates the systems which may optionally employ a foam generation system—i.e. in combination with an inert gas, and which is indicated by reference numeral 20. As also noted, the different systems may employ sheet/film pre-heating means indicated by reference numeral 22 which may be by, e.g. induction heating.

In the continuous/discontinuous systems of FIG. 1, a source of raw material indicated by supply means 24 may be provided for such systems With respect to the continuous system illustrated in FIG. 1, an extruder 15 may be employed with feed inlets 17 and 19 for feeding components e.g. A and B on one hand and C and D on the other hand. Feeding through this particular system need not be through inlets 17 and 19. In the case of the discontinuous system, there may be employed a melt-kneader indicated generally by reference numeral 21 which includes a motor 23. As otherwise explained herein, other systems may be employed for this purpose.

Figure 2:
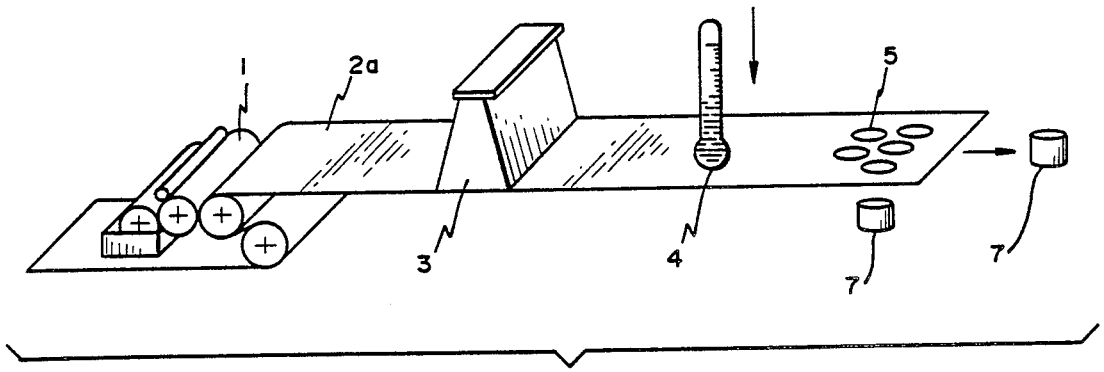
FIG. 2 is a schematic perspective illustration showing another embodiment of the application of the compositions of the present invention.
Figure 3:
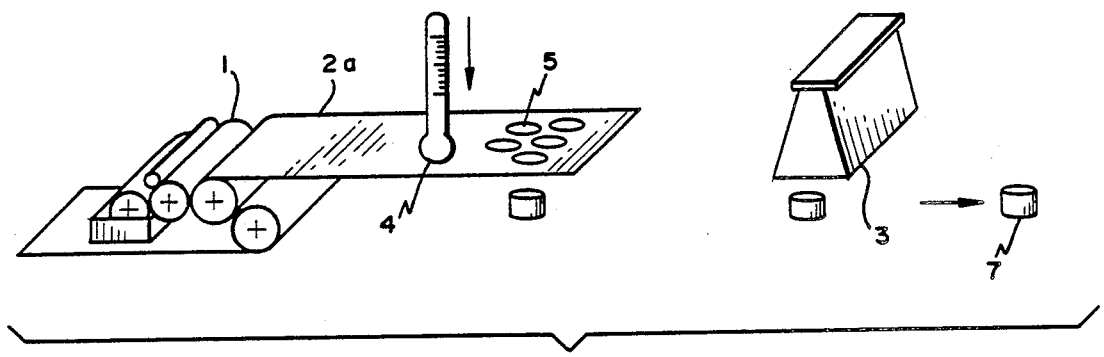
FIG. 3 is a perspective schematic illustration showing an alternative to that of FIG. 2.
Figure 4:
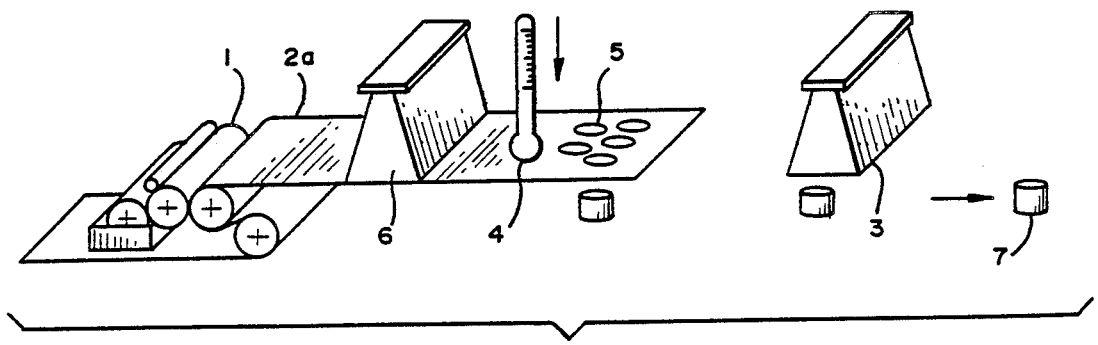
FIG. 4 is a perspective schematic illustration showing an alternative to that of FIG. 2.

FIGS. 2 to 4 demonstrate, by way of example, a method for producing formed bodies from a coiled sheet, which includes the application and cross-linking of the melt compositions of this invention.

Referring now to FIG. 2, there is illustrated a first combination according to the present invention, in which a coil 2 of material to be formed into a substrate or body is provided, which is unwound into a web 2a and then fed through a coating apparatus generally indicated by reference numeral 1, where a melt composition is applied to the web 2a. With the temperature remaining high, the melt composition undergoes cross-linking with an electron radiation device 3, such as an electron beam curing apparatus. The activity of the molecules is such that in the melt composition, beneficial reactivity for cross-linking purposes during curing is promoted. A cooling device indicated by reference numeral 4 is provided to cool the sheet and coating composition as it is transmitted to a forming station indicated generally by reference numeral 5, where bodies or containers 7 are formed.

Referring now to FIG. 3, a second combination is illustrated, in which a somewhat different process path to that previously described, which offers some ideal product-forming conditions. After a melt composition has been applied by a coating apparatus 1, and treatment with an electron beam curing device 3, nd with subsequent cooling of the sheet by cooling means 4, a forming station 5 is employed to form bodies 7. This option, which involves the preparation of special melt compositions, is of a practical application since in the process, the melt viscosity rises very sharply during cooling. The anti-corrosion layer is, however, very elastic so that sheet deformation will not produce microtearing, porosity, etc. Radiation cross-linking will take place after the sheet has been formed into a body. In this respect, it should be noted that fluctuations in radiation dosage to the formed bodies must be restricted (such variation being a function of the distance between the radiation device and the formed body). An extreme deep-draw ratio should thus normally to be avoided for that purpose. This process may, however, be employed in the metal packaging industry, as in i.e. the production of fish tins and covers, whereby the deep-draw ratio is not too great.

Referring to FIG. 4, a third combination is illustrated which is applicable in the event that the increase in viscosity is not sufficient to complete the production of a formed body according to the above second combination; this third combination provides a further option for superficially cross-linking an applied melt composition by bombarding the latter with a weak electron stream (e.g. 0.5 to 1.0 millirads) with a device 6 suitable for this purpose. The resultant superficial cross-linking and the subsequent cooling phase indicated by reference 4 raises the viscosity sufficiently to enable the melt composition to withstand the subsequent forming process 5. The formed body or product can then be moved to the final cross-linking stage using an electron beam curing device 3, where in accordance with the second combination described above, formed bodies with a minimal deep-draw ratio can be processed.

EXAMPLE 24

The melt compositions of Examples 1 to 22 were placed in the melt kneader or melt dissolver at the prevailing required application temperatures of between +100° C. and 220° C., where substrates of aluminum, steel, polyvinylchloride and kraft paper were coated. The test substrates (18×12.5 cm) were coated with coating material in weights ranging from about 3 to 10 g/m². The substrates and the coating blade were pre-warmed at different temperatures. Depending on the curing process used, the following reaction initiators were, if required, added to the polymerisable melt compositions shortly before application:

| | |
|---|---|
| Free radical curing: | 1.8 weight percent dicumylperoxide (50% as softener) |
| UV curing: | 3.0 weight percent IRGACURE ® 184 |
| Electron beam curing (EBC): | no additives |
| The curing parameters were as follows: | |
| Free radical curing (FRC): | (a) metals: 150-14 200° C. (b) PVC: 120° C. (c) Kraft Paper: 140° C. |
| UV curing: | 30 seconds under an UV lamp 80 watts/cm in a nitrogen |

| | -continued | |
|---|---|---|
| Electron beam curing: | atmosphere 2 to 6 millirads (a) inert tas, N$_2$ (b) film of condensed-out water | |

| Assessment Criteria | |
|---|---|
| unsatisfactory | sterilization. = poor adhesion during the grid test |

TABLE 4

| Melt Composition Number | Substrate | Coating Weight g/m² | Application Temperature °C. | Type of Hardening (Curing) | Adhesion/ Grid Test With Adhesive Tape 20° C. | After Sterilization |
|---|---|---|---|---|---|---|
| 1 | Aluminum | 8 | 100 | EBC 6 Mrad | good | good |
|  |  | 5 | 180 |  | very good | very good |
| 2 | Aluminum |  |  |  | very good | very good |
| 3 | Steel | 5 | 180 | EBC 6 Mrad | very good | very good |
|  |  |  |  | EBC 5 Mrad | very good | very good |
|  | Aluminum | 3 | 150 | UV | good | good |
| 4 | Aluminum | 8 | 220 | EBC 5 Mrad | good | very good |
| 5 | Steel | 6 | 200 | EBC 5 Mrad | very good | very good |
| 6 | Tin Plate | 4 | 180 | EBC 4 Mrad | very good | very good |
| 7 | Paper | 3 | 140 | UV | good | good |
| 8 | Paper | 5 | 160 | FRH | good | good |
| 9 | Aluminum |  |  |  | very good | very good |
|  | Tin Plate | 4 | 180 | EBC 3 Mrad | good | good |
| 10 | Steel | 7 | 130 | FRH | good | satisfactory |
| 11 | Tin Plate | 6 | 180 | UV | good | satisfactory |
| 12 | Aluminum |  |  |  | very good | very good |
|  | Tin Plate | 5 | 185 | EBC 5 Mrad | very good | very good |
| 13 | Steel | 9 | 120 | EBC 6 Mrad | good | very good |
| 14 | Tin Plate | 5 | 150 | EBC 4 Mrad | very good | very good |
| 15 | Aluminum |  |  |  | good | good |
|  | Tin Plate | 5 | 170 | EBC 4 Mrad | satisfactory | unsatisfactory |
| 16 | PVC | 3 | 120 | EBC 3 Mrad | good | very good |
| 17 | Aluminum |  | 160 |  | good | very good |
|  | PVC | 4 | 120 | EBC 3 Mrad | good | good |
| 18 | Steel | 5 | 190 | UV | good | satisfactory |
|  |  |  |  | EBC 4 Mrad | very good | very good |
| 19 | Steel | 5 | 185 | UV | satisfactory | unsatisfactory |
| 20 | Aluminum |  |  |  |  |  |
|  | Tin Plate | 6 | 180 | EBC 6 Mrad | very good | very good |
| 21 | Paper |  |  |  |  |  |
|  | Aluminum | 4 | 110 | EBC 2 Mrad | very good | very good |
| 22 | Tin Plate | 8 | 195 | EBC 5 Mrad | very good | very good |

EBC = Electron Beam Curing
Mrad = Millirad
UV = Ultra Violet
FRH = Free Radical Hardening (Curing)

After the melt compositions had cured upon the various substrates, the resulting coated substrates were stored for 24 hours at 23° C. and then after adhering were checked before and after a sterilization test. The sterilization requirements were 60 minutes at +129° C. in steam. The quality of adherence was determined by means of the known grid and adhesive tape tests (TESAFILM ® 154). The results are recorded in Table 4.

| Assessment Criteria | |
|---|---|
| very good | = smooth edges produced during the grid test and no lifting of film by adhesive tape; no clouding of the coating film after sterilization with steam |
| good | = smooth edges produced by the grid test and no lifting of film by adhesive tape; slight clouding of the coating film after sterilization with steam |
| satisfactory | = cut edges are still smooth; no lifting of film by adhesive tape; clouding of film after steam |

We claim:
1. A method of coating a substrate to provide a protective coating or film thereon, said method comprising the steps of:
(a) providing a solvent-free, low monomer or monomer-free, polymerizable hot melt comprised of a polymerizable component selected from the group consisting of (1) at least one polymerizable, hydroxyl-containing polymer containing <0.01 wt. % residual free monomers and having a mean molecular weight ($\overline{M}_w$) of between about 1,000 and about 500,000 and a glass transition temperature ($T_g$) ≧ −20° C. to +181° C.; (2) at least one polymerizable, linear straight chain and/or branched polyester and/or copolymer thereof containing ≦0.1 wt. % residual free monomers and having a mean molecular weight ($\overline{M}_w$) between about 800 and about 50,000 and a glass transition temperature ($T_g$) ≧ −50° C. to +50° C.; (3) components (1) and (2) in admixture; and (4) components (1) and/or (2) in admixture with a polymerizable, ethylenically-unsaturated group carrying oligomer consisting of acrylic, methacrylic, ether, ester, urethane, amide, imide, epoxy, siloxane, phenol, novolak and/or mercapto compounds containing ≦0.5 wt. % re- sidual free monomers and having a mean molecular weight ($\overline{M}_w$) of about 400 to about 10,000;

(b) applying said hot melt to a substrate in the form of a coating or thin film, and (c) polymerizing said hot melt.

2. The method of claim 1 wherein said substrate is preheated to at least +50° C. prior to application of said hot melt thereto.

3. The method of claim 2 wherein said substrate is a plastic material and said material is preheated to a temperature 10° C. below the softening point of same.

4. The method of claim 2 wherein said substrate is a cellulosic or inorganic material and said material is preheated to a temperature of at least +100° C.

5. The method of claim 1 wherein any free radicals present are cured by means of a peroxide or hydroperoxide initiator in the presence of heat or with ultraviolet or electron beams.

6. The method of claim 1 wherein said polymerization occurs by means of an electron beam.

7. The method of claim 1, wherein at least one of said polymerizable compounds is at least a partially crystalline compound.

8. The method of claim 1, wherein said hydroxyl-containing polymer (1) is a cellulose derivative.

9. The method of claim 8, wherein said hydroxyl-containing polymer (1) is cellulose ester, cellulose ether or a mixture thereof containing at least about 0.1% by weight of reactive acrylic groups, methacrylic groups or a mixture thereof and having a mean molecular weight ($\overline{M}_w$) between about 10,000 and about 250,000.

10. The method of claim 1, wherein said hydroxyl-containing polymer (1) is a polyvinyl alcohol derivative containing $\geq 0.1\%$ by weight of reactive acrylic groups, methacrylic groups or a mixture thereof and having a mean molecular weight ($\overline{M}_w$) between about 10 and about 100,000 and a glass transition temperature ($T_g$) of $\geq -20°$ C.

11. The method of claim 1, wherein said hydroxyl-containing polymer (1) is a phenol or novolak derivative containing $\geq 0.1\%$ by weight of reactive acrylic groups, methacrylic groups, or mixture thereof and having a mean molecular weight ($\overline{M}_w$) between about 1,000 and about 50,000 and a glass transition temperature ($T_g$) of $\geq -20°$ C.

12. The method of claim 1, wherein the polymer (2) is a linear, straight-chain polyester or copolyester, or a mixture thereof, or a branched polyester or copolyester or a mixture thereof, or a mixture of (a) said straight chain polyester or copolyester or mixtures thereof and (b) said branched polyester or copolyester or mixture thereof, said polymer (2) containing $\geq 0.1\%$ by weight of reactive acrylic groups, methacrylic groups, or a mixture thereof and having a mean molecular weight ($\overline{M}_w$) between about 1,000 and about 20,000.

13. The method of claim 12, wherein the mean molecular weight is between about 1,000 and 10,000.

14. The method of claim 1, wherein said polymer (2) is a hydroxyl containing basic polyester selected from (a) a hydroxyl polyester having branched chains of polyester units with branches at three or more polyester forming functions, (b) a hydroxyl polyester with alkyl side chains linked through ester or ether groups of three or more polyester forming functions, and containing $\geq 0.1\%$ by weight of reactive acrylic groups, methacrylic groups, or a mixture thereof and having a mean molecular weight ($\overline{M}_w$) of about 1,000 to about 20,000.

15. The method of claim 1, further including the step of prepolymerizing the hot melt after application to said substrate to a degree sufficient for further processing, forming the substrate and subsequently completely curing the hot melt.

16. The method of claim 15, wherein the method is carried out in an inert medium.

17. The method of claim 16, wherein the inert medium is nitrogen, carbon dioxide or a noble gas.

18. The method of claim 17, wherein the inert medium is preheated.

19. The method of claim 1, wherein said polymerizable hot melt is polymerized or cured by spraying water on said coating of said hot melt, cooling said coated substrate by providing an atmosphere of high humidity about said substrate to result in the condensation of water on the surface of said substrate, and removing said condensed water from said surface upon polymerization or curing of said coating.

* * * * *